United States Patent
Yao

(10) Patent No.: US 11,463,571 B2
(45) Date of Patent: Oct. 4, 2022

(54) CHEMICALLY TIME-LIMITED USE MOBILE COMMUNICATIONS DEVICES AND METHODS FOR PROVIDING COMMUNICATIONS SERVICES USING THE SAME

(71) Applicant: DISH Wireless L.L.C., Englewood, CO (US)

(72) Inventor: Kevin Yao, Cheyenne, WY (US)

(73) Assignee: DISH Wireless, L.L.C., Englewood, CO (US)

( * ) Notice: Subject to any disclaimer, the term of this patent is extended or adjusted under 35 U.S.C. 154(b) by 0 days.

(21) Appl. No.: 17/171,536

(22) Filed: Feb. 9, 2021

(65) Prior Publication Data

US 2022/0256021 A1    Aug. 11, 2022

(51) Int. Cl.
 *H04M 1/02*   (2006.01)
 *H04B 1/3816*  (2015.01)
 *H04M 1/675*  (2006.01)

(52) U.S. Cl.
 CPC ........ *H04M 1/0277* (2013.01); *H04B 1/3816* (2013.01); *H04M 1/675* (2013.01)

(58) Field of Classification Search
 CPC .... H04M 1/0277; H04M 1/675; H04B 1/3816
 See application file for complete search history.

(56) References Cited

U.S. PATENT DOCUMENTS

| | | | | |
|---|---|---|---|---|
| 2008/0099559 A1* | 5/2008 | Lo | ..................... | G06K 19/07769 235/441 |
| 2011/0114519 A1* | 5/2011 | Narendrnath | ....... | H01L 21/6831 206/349 |
| 2016/0050750 A1* | 2/2016 | Rogers | ................... | H05K 3/285 361/767 |

OTHER PUBLICATIONS

Gao et al., Moisture-Triggered Physically Transient Electronics, Science Advances, American Association for the Advancement of Science, Washington, DC, Sep. 1, 2017, pp. 8. (Year: 2017).*

* cited by examiner

*Primary Examiner* — Yuwen Pan
*Assistant Examiner* — Angelica M Perez
(74) *Attorney, Agent, or Firm* — KW Law, LLP

(57) ABSTRACT

A subscriber identity module (SIM) card includes a housing, a printed circuit board contained within the housing, and a plurality of metallic contact pads on a surface of the printed circuit board. At least one contact pad of the plurality of metallic contact pads comprises an enclosed, interior portion. The SIM card further includes a corrosive chemical agent contained within the interior portion. The corrosive chemical agent reacts chemically with the at least one metallic contact pad, in the presence of oxygen, to cause the at least one metallic contact pad to corrode over a period of time.

19 Claims, 3 Drawing Sheets

Figure 1:
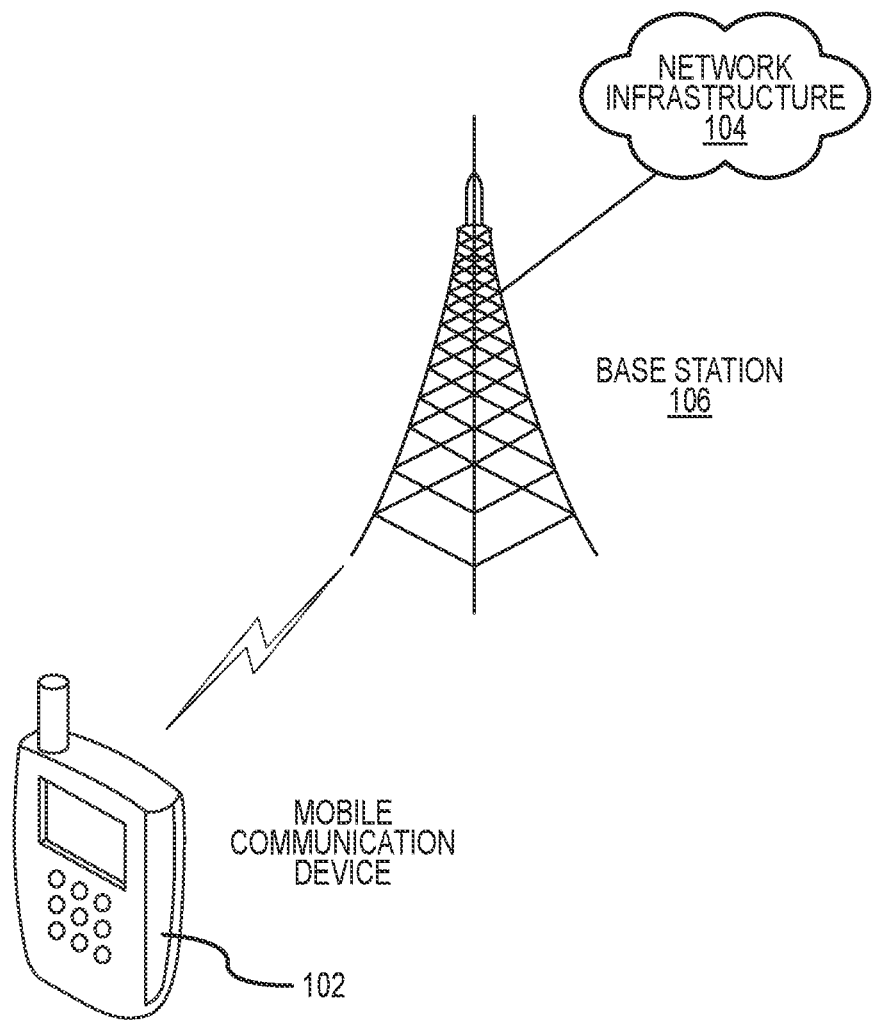

CHEMICALLY TIME-LIMITED USE MOBILE COMMUNICATIONS DEVICES AND METHODS FOR PROVIDING COMMUNICATIONS SERVICES USING THE SAME

TECHNICAL FIELD

The present disclosure generally relates to mobile communications devices that utilize subscription-based communications networks, such as cell phones, smart phones, tablets, laptop computers, and the like, and to methods for providing communications services with such mobile communications devices. More particularly, the present disclosure relates to mobile communications devices that incorporate chemical features that limit their use on subscription-based networks to a pre-defined period of time, and to methods for providing communications services with such networks in a time-limited manner.

BACKGROUND

Mobile communication devices may require some capability to connect with a wide area wireless network, such as a cellular telecommunications network, etc., in order to effectuate communication. These telecommunications networks are often subscription-based. For example, some mobile communication devices may have a subscriber identity module (SIM) card or similar component for identifying the subscriber using the communication device to a wireless network. A SIM card is a small card that is inserted in a slot formed at a mobile terminal. A SIM card may be a "smart card" that is capable of storing information and performing a process or operation in conjunction with a microprocessor and memory included in the mobile terminal. A communication subsystem having one or more transceivers and related circuitry within the mobile communication device may enable radio communication between the mobile communication device and a wireless network.

In order to purchase a subscription on a telecommunications network, a consumer may enter a network operator or third party retail store/storefront, select a mobile communication device such as a smartphone, activate the device, and purchase a network service subscription from a network operator. For example, in order to activate the device, a salesperson in the storefront may have to install an inactive SIM card into the device, and then coordinate with the network operator to activate the SIM card in accordance with the parameters associated with a chosen service subscription. All the while, the consumer may be expending time, energy, and expense while the network operator may be incurring overhead costs associated with providing the storefront and employing the sales force in order to provide the customer service required for the sales and activation of the device. This may be particularly true in the context of short-term service plans, where the consumer may need to repeat this process as often as monthly, depending on the length of the plan.

It would thus be desirable to offer mobile communications devices and associated network service plans that avoid the need for the consumer to return to a physical store front whenever a new SIM card would be required to maintain network service. These and other desirable features and characteristics will become apparent from the subsequent detailed description and the appended claims, taken in conjunction with the accompanying drawings and this background section.

BRIEF SUMMARY

Mobile communications devices that utilize subscription-based communications networks and methods for providing communications services with such mobile communications devices are disclosed. In accordance with one exemplary embodiment, a subscriber identity module (SIM) card includes a housing, a printed circuit board contained within the housing, and a plurality of metallic contact pads on a surface of the printed circuit board. At least one contact pad of the plurality of metallic contact pads comprises an enclosed, interior portion. The SIM card further includes a corrosive chemical agent contained within the interior portion. The corrosive chemical agent reacts chemically with the at least one metallic contact pad, in the presence of oxygen, to cause the at least one metallic contact pad to corrode over a period of time.

In accordance with another embodiment, a method for providing mobile communications services includes manufacturing or obtaining a subscriber identity module (SIM) card. The SIM card includes a housing, a printed circuit board contained within the housing, and a plurality of metallic contact pads on a surface of the printed circuit board. At least one contact pad of the plurality of metallic contact pads includes an enclosed, interior portion. The SIM card further includes a corrosive chemical agent contained within the interior portion. The corrosive chemical agent reacts chemically with the at least one metallic contact pad, in the presence of oxygen, to cause the at least one metallic contact pad to corrode over a period of time. The SIM card is enclosed within air-tight packaging. The method further I includes providing the SIM card enclosed within the air-tight packaging to a consumer and operating a telecommunications network that is operable to provide mobile communications to a consumer mobile device that has the SIM card inserted therein. The mobile communications are provided during the period of time until the corrosive chemical agent has corroded the at least one metallic contact pad such that the SIM card is no longer operable within the consumer mobile device.

This Brief Summary is provided to describe select concepts in a simplified form that are further described in the Detailed Description. Moreover, this Brief Summary is not intended to identify any key or essential features of the claimed subject matter, nor is it intended to be used as an aid in determining the scope of the claimed subject matter.

BRIEF DESCRIPTION OF THE DRAWING FIGURES

Figure 2A:
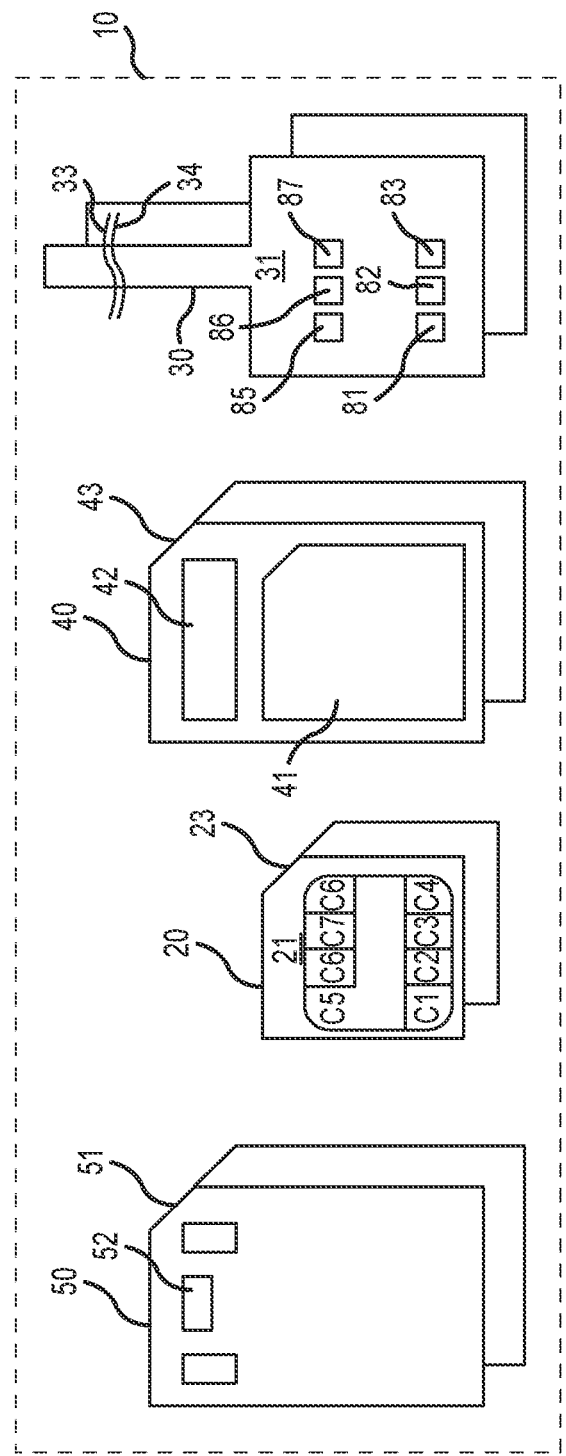
Figure 2B:
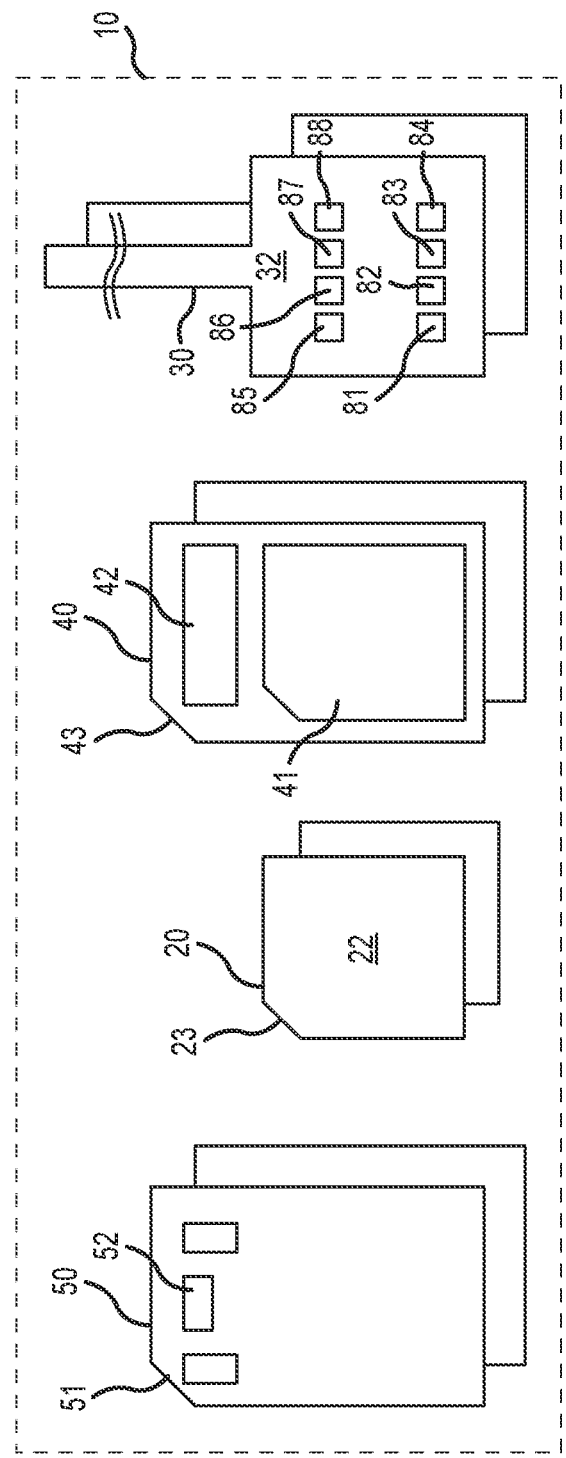

Exemplary embodiments will hereinafter be described in conjunction with the following drawing figures, wherein like numerals denote like elements, and wherein:

FIG. 1 is a diagram illustrating a network environment in which a mobile communication device may operate within a wireless network according to an embodiment of the present disclosure; and FIG. 2A is a perspective view from the bottom, and FIG. 2B is a perspective view from the top, of an interface SIM card carrier and SIM card according to an embodiment of the present disclosure.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

The present disclosure generally relates to mobile communication devices that utilize subscription-based communications networks, such as cell phones, smart phones, tablets, laptop computers, and the like, and to methods for providing communications services with such mobile communications devices. A consumer may be in possession of a mobile communication device, but the consumer may not have a SIM card for such device in order to allow the device to access a subscription-based mobile telecommunications network. In accordance with an exemplary embodiment, the present disclosure provides SIM cards that incorporate chemical features that limit their use on subscription-based networks to a pre-defined period of time, and methods for providing communications services with such networks in a time-limited manner.

For example, the SIM cards of the present disclosure may be provided in a sealed package that prevents exposure of the SIM card to the atmospheric environment. Upon purchase, the consumer may open the package and deploy the SIM card within the consumer's mobile communication device. The SIM card may be provided with a chemical agent which, when exposed to oxygen, causes metallic components of the SIM card, such as electrical contacts, to degrade over a period of time. The nature and amount of chemical agent may be such that the length of a network subscription associated with the SIM card to be equivalent to the period of time from first exposure to oxygen until the metallic components degrade to such an extent that the SIM card becomes unusable within the mobile communication device. If the consumer desires further network access, the consumer may simply purchase another SIM card. In this manner, the consumer is able to obtain a time-limited subscription to a mobile communications network, without the need to return the communications device/SIM card to a store at the expiry of each subscription period.

Telecommunications Network Environment

Referring now to the drawings, and more particularly to FIG. 1, there is shown an exemplary telecommunications network environment 100 wherein an embodiment of the present disclosure may be practiced. A mobile communication device 102 may communicate with a network infrastructure 104 through base station 106, such as a cellular tower. Device 102 may include any portable computer (e.g., laptops, palmtops, or handheld computing devices) or a mobile communications device (e.g., cellular phones or data-enabled handheld devices capable of receiving and sending messages, web browsing, etc.), or any enhanced personal digital assistant (PDA) device or integrated information appliance capable of email, video mail, Internet access, corporate data access, messaging, voice call and video chat over data connection, calendaring and scheduling, information management, and the like, that may be operable in one or more modes of operation.

In embodiments, the network infrastructure 104 may include any category of communication spaces capable of providing service to device 102. There may exist any number of Public Land Mobile Networks (PLMNs) that are operable to provide cellular telephony services which may or may not include packet-switched data services. Depending on the coverage area(s) and whether the user is roaming, the network infrastructure 104 can include a number of cellular RANs, associated home networks (i.e., home PLMNs or HPLMNs) and visited networks (i.e., VPLMNs), each with appropriate infrastructure such as Home Location Register (HLR) nodes, Mobile Switching Center (MSC) nodes, and the like. Because the network infrastructure 104 may also include a General Packet Radio Service (GPRS) network that provides a packet radio access for mobile devices using the cellular infrastructure of a Global System for Mobile Communications (GSM)-based carrier network, one or more Serving GPRS Support Nodes (SGSNs) may be incorporated therein. Alternatively, the network infrastructure 104 may include an Evolved Packet System (EPS) network that provides a packet radio access for mobile devices using a cellular infrastructure, one or more eNBs (Evolved Node B(asestation)s), MMES (Mobility Management Entities), SGWs (Service Gateways) and PGWs (Packet Data Network (PDN) Gateways) may be incorporated therein. The PLMNs of the network infrastructure 104 may include networks such as one or more Enhanced Data Rates for GSM Evolution (EDGE) networks, Integrated Digital Enhanced Networks (IDENs), Code Division Multiple Access (CDMA) networks, Universal Mobile Telecommunications System (UMTS) networks, Universal Terrestrial Radio Access Networks (UTRANs), Evolved UTRAN (E-UTRAN), or any $3^{rd}$ Generation Partnership Project (3GPP)-compliant network (e.g., 3GPP or 3GPP2), Long Term Evolution (LTE) network, or any of the 5G network infrastructure/components, such as gNBs (gNode B(asestation)s), MMEs (Mobility Management Function, including AMF (Access and Mobility Functions) and SMF (Session Management Functions)), among others, all operating with well-known frequency bandwidths and protocols.

SIM Card

In accordance with an exemplary embodiment, FIGS. 2A and 2B illustrate perspective views from the bottom and from the top, respectively, of various components in a SIM card carrier 10 that includes a SIM card 20. The dual interface SIM card carrier 10 may include a circuit board 30, such as a flexible printed circuit board, a housing or chip housing 40 for housing the SIM card 20, and a cap 50 that fits over the housing 40 to hold the SIM card 20 in a stable position.

The circuit board 30 may have a first principal surface 31 from the bottom view and a second principal surface 32 from the top view. The first principal surface 31 of the circuit board 30 may include six contact pads 81, 82, 83, 85, 86, 87 for making connections at a SIM card slot of a mobile communications device, such as device 102 shown in FIG. 1. The six contact pads on the first principal surface of the circuit board 30 may correspond to contact pads C1-C3 and C5-C7 on the chip card 20 for making electrical connections. The second principal surface 32 of the circuit board 30 may include eight contact pads, 81, 82, 83, 84, 85, 86, 87, 88, with the addition of contact pads C4 and C8 from the six contact pads, C1-C3 and C5-C7. The contact pads C4 and C8 on the second principal surface of the chip card 20 may be used for connecting to a connector or port of an antenna, which, when present, may be used for near-field communications. The contact pads C1-C8 may be made of or coated with an electrically-conductive metal, such as gold (Au), or an alloy of gold.

In an embodiment, the chip housing 40 may have a first slot 41 for holding the SIM card 20 and a second slot 42 for routing wires through the chip housing. The first slot 41 may be provided for placing the SIM card 20 in the chip housing 40. A corner 23 of the first slot 41 may be cut at an angle to ensure correct orientation when the SIM card 20 is placed in the first slot 41. The SIM card 20 may be inserted in the first slot 41 with the angled corner 23 with the correct orientation. The SIM card 20 may have an inwardly-facing surface 21 with a plurality of contact pads 1-8 (C1-C8) and an outwardly-facing surface 22. The inwardly-facing surface 21 of the SIM card 20 may include eight contact pads, C1 through C8. The eight contact pads C1 through C8 may be specified and defined in accordance with a smart card standard of the ISO 7816-2, for example.

The cap 50 may include a corner 51 that is cut at an angle for matching correct orientation with a corner of the chip housing 40 that is also cut when placing the cap over the chip housing 40. The SIM card 20 may be inserted in the first slot 41 with the angled corner 23 in the correct orientation. The cap 50 may include a through-hole for passing a wire through the cap 50. The cap 50 may further include a through hole 52 for passing through the pair of wires 33, 34 through the cap 50.

Chemical Agent

As initially noted, the SIM card 20 may be provided with a chemical agent which, when exposed to oxygen, causes metallic components of the SIM card 20, such as the electrical contacts C1-C8, to degrade or corrode over a period of time. The nature and amount of chemical agent may be such that the length of a network subscription associated with the SIM card 20 to be equivalent to the period of time from first exposure to oxygen until the metallic components degrade to such an extent that the SIM card 20 becomes unusable within the mobile communications device. The chemical agent may be present within an interior portion of the contacts. The interior portion may not be hermetically sealed such that the interior portion is exposed to the atmosphere, particularly oxygen in the atmosphere, once the Sim card 20 is removed from its air-tight, sealed packaging. The chemical agent may be present in the form of a liquid, gel, paste, or solid.

In some embodiments, as noted above, the contacts of the SIM card 20 may be made of a metal, such as gold. Accordingly, in these embodiments, the chemical agent may be selected as a compound capable of causing electrochemical oxidation (corrosion) in gold when exposed to oxygen, i.e., a gold corrosive. Corrosion is a chemical process that converts a refined metal into a more chemically stable form such as oxide, hydroxide, or sulfide. It is the gradual destruction of metals by chemical and/or electrochemical reaction with another chemical substance. This type of damage may produce oxide(s) or salt(s) of the original metal and results in a loss of electroconductive properties. The chemistry of corrosion may be considered as an electrochemical phenomenon. During corrosion at a particular spot on the surface of the object made of metal, oxidation takes place and that spot behaves as an anode. The electrons released at this anodic spot move through the metal and go to another spot on the metal and reduce oxygen at that spot in presence of $H^+$. This spot behaves as a cathode.

The element gold is known to corrode in the presence of group 15 and group 16 oxides, such as oxides of sulfur and nitrogen. Accordingly, the chemical agent may be selected from compounds which, when exposed to oxygen, form oxides of sulfur, nitrogen, or phosphorous. In a first example, the oxide of nitrogen may be selected as nitrogen dioxide ($NO_2$). $NO_2$ may be formed by the oxidation of nitric oxide by oxygen in the air:

$$2NO + O_2 \rightarrow 2NO_2$$

Accordingly, the chemical agent in this embodiment may be selected as a dilute solution containing nitric oxide. The nitric oxide, when exposed to oxygen in the air after the SIM card 20 is removed from its sealed package, form nitrogen dioxide, which then proceeds to cause a corrosive effect on the gold contacts over time.

In another example, the oxide of nitrogen may be selected as sulfur dioxide ($SO_2$). $SO_2$ may be formed by the oxidation of sulfur by oxygen in the air:

$$S + O_2 \rightarrow SO_2$$

Accordingly, the chemical agent in this embodiment may be selected as a dilute solution containing sulfur, or as a dilute solution of a sulfur-containing species. The sulfur, when exposed to oxygen in the air after the SIM card 20 is removed from its sealed package, form sulfur dioxide, which then proceeds to cause a corrosive effect on the gold contacts over time. Furthermore, in some embodiments, combinations of both and oxide of nitrogen and an oxide of sulfur may be used.

Of course, group 15 and 16 oxides are not the only chemical species that may have a corrosive effect on gold contacts, and as such the disclosure is not limited to these two illustrative examples. Rather, the person having ordinary skill in the art will be familiar with other suitable chemicals which, when exposed to oxygen, may have a corrosive effect on gold. Furthermore, while gold, or gold coatings, are commonly used as the metal for contacts in SIM cards, the present disclosure contemplates that other metals may alternatively be employed, in some embodiments, for example alloys of copper, iron, chromium, silver, nickel, and cobalt, among others. In these embodiments, an alternative chemical agent may be selected that is known to have corrosive properties on such metals. For example, copper, which is a conductive metal commonly used in electronics, oxidizes when exposed to salt solutions (such as halide salts) and oxygen.

The concentration of the nitric oxide or the sulfur dioxide (or other corrosive) in the chemical agent contained within the contacts of the SIM card 20 may depend on the period of time that that SIM card 20 is desired to remain operative. In general, relatively lower concentrations of the chemical agent may result in a relatively longer period of time, whereas relatively higher concentrations of the chemical agent may result in a relatively shorter period of time. The length of the period of time may be selected based on the term of the network subscription purchased by the consumer, and may range from about 1 week to about 2 or more years, such as about 1 month to about 1 year.

In embodiments, the SIM card 20 is packaged in an enclosure and atmosphere that protects it from the environmental stimulus that causes its corrosion. For example, the SIM card 20 described above may be packaged in a metallized foil package containing a non-reactive gas such as carbon dioxide, nitrogen, or argon. The pressure of gas(es) in the package may be sub-atmospheric, for example less than about 1 torr. The packaging may be "air-tight" in the sense that it does not permit any atmospheric gasses to penetrate into the packaging. This packaging may serve to protect the SIM card 20 from oxygen and water, for example, thus preventing the corrosion reaction from initiating.

Manufacturing the SIM card 20 and packaging it in an enclosure and/or atmosphere that protects it from the environmental stimulus that causes its failure may be performed with the goal of controlling the exposure of the finished SIM card 20 to the environmental stimulus that causes its failure during the manufacturing and/or the packaging operations. For example, SIM cards manufactured today may sit unpackaged for a substantial amount of time before being packaged. Such a time lag may act to significantly degrade the signal quality of the SIM cards of this disclosure before they are even packaged. Therefore, the SIM cards may be packaged in the protective enclosure and/or atmosphere within about 24 hours of their production, for example within about 8 hours of their production, such as within about one hour of their production. Stated alternatively, the SIM cards may be packaged in their protective enclosure and/or atmosphere in a time period of less than about 50%, for example less than about 1% of their expected degradation time.

In a typical use scenario, a consumer will purchase the SIM card, as enclosed in the air-tight packaging. The consumer will then open the packaging, causing the SIM card to be exposed to oxygen, thus beginning the chemical reaction process, as described above, which will degrade the metallic (most often gold) contacts of the SIM card over a pre-defined period of time. The consumer will insert the SIM card into their phone (or other device), and will be able to use the phone normally during the pre-defined period of time. Once the pre-defined period of time has elapsed, the metallic contacts of the SIM card will have degraded, via the chemical reaction process, to the extent that the SIM card is no longer able to make electrical contact with their phone, and thus the phone will cease to have wireless connectivity on the network. The SIM card may then be removed and disposed of. The consumer may then order another SIM card, if desired, and repeat this process of use. As such, in this manner the consumer may have access the mobile communications services under a subscription lasting for a pre-defined period of time, using the SIM cards of the present disclosure.

Furthermore, in some embodiments, in addition to the corroding of the metals in the SIM card, during the registration process, when the SIM card is first activated in the network, the SIM card may send a predetermined expiration value based the SIM card's pre-defined degrading period of time to the network that is associated with the SIM card. If, for any reason, the corrosion/degradation mechanism of action, as described above, fails to render the SIM card useless at the expiry of the pre-defined period of time, the backend system of the network may issue a termination command based on this expiration value. In this manner, a back-up means for rendering the SIM card inoperable may be provided.

Accordingly, various embodiments of methods and systems mobile communications devices that incorporate chemical features that limit their use on subscription-based networks to a pre-defined period of time, and to methods for providing communications services with such networks in a time-limited manner. The SIM card may be provided with a chemical agent which, when exposed to oxygen, causes metallic components of the SIM card, such as electrical contacts, to degrade over a period of time. The nature and amount of chemical agent may be such that the length of a network subscription associated with the SIM card to be equivalent to the period of time from first exposure to oxygen until the metallic components degrade to such an extent that the SIM card becomes unusable within the mobile communication device. If the consumer desires further network access, the consumer may simply purchase another SIM card. In this manner, the consumer is able to obtain a time-limited subscription to a mobile communications network, without the need to return the communications device/SIM card to a store at the expiry of each subscription period.

The term "exemplary" is used herein to represent one example, instance or illustration that may have any number of alternates. Any implementation described herein as "exemplary" is not necessarily to be construed as preferred or advantageous over other implementations.

While several exemplary embodiments have been presented in the foregoing detailed description, it should be appreciated that a vast number of alternate but equivalent variations exist, and the examples presented herein are not intended to limit the scope, applicability, or configuration of the invention in any way. On the contrary, various changes may be made in the function and arrangement of elements described without departing from the scope of the claims and their legal equivalents. Many other modifications and enhancements could be provided in a wide array of alternate but equivalent embodiments.

What is claimed is:

1. A subscriber identity module (SIM) card comprising:
a housing;
a printed circuit board contained within the housing;
a plurality of metallic contact pads on a surface of the printed circuit board, wherein at least one contact pad of the plurality of metallic contact pads comprises an enclosed, interior portion; and
a corrosive chemical agent contained within the interior portion, wherein the corrosive chemical agent reacts chemically with oxygen in the air to cause the at least one metallic contact pad to corrode over a period of time, wherein an amount of the corrosive chemical agent is configured so that the SIM card remains operative for the period of time until the at least one metallic contact pad degrades to an extent that the SIM card becomes unusable.

2. The SIM card of claim 1, wherein each contact pad of the plurality of metallic contact pads comprises an enclosed, interior portion, and wherein each enclosed, interior portion contains the corrosive chemical agent.

3. The SIM card of claim 1, wherein the plurality of metallic contact pads comprise gold or a gold alloy.

4. The SIM card of claim 3, wherein the corrosive chemical agent comprises an elemental group 15- or group 16-containing chemical species.

5. The SIM card of claim 4, wherein the corrosive chemical agent comprises a nitrogen-containing species.

6. The SIM card of claim 4, wherein the corrosive chemical agent comprises a sulfur-containing species.

7. The SIM card of claim 1, wherein the corrosive chemical agent is in the form of a liquid, gel, paste, or solid.

8. The SIM card of claim 1, wherein a concentration of the corrosive chemical agent contained within the interior portion is selected such that the period of time is from about 1 month to about 1 year.

9. The SIM card of claim 1, wherein the SIM card is enclosed within air-tight packaging.

10. The SIM card of claim 9, wherein the air-tight packaging comprises a non-reactive gas.

11. The SIM card of claim 1, wherein the SIM card is operably inserted within a mobile communications device.

12. A method for providing mobile communications services comprising:
manufacturing or obtaining a subscriber identity module (SIM) card, wherein the SIM card comprises:
a housing;
a printed circuit board contained within the housing;
a plurality of metallic contact pads on a surface of the printed circuit board, wherein at least one contact pad of the plurality of metallic contact pads comprises an enclosed, interior portion; and a corrosive chemical agent contained within the interior portion, wherein the corrosive chemical agent reacts chemically with oxygen in the air to cause the at least one metallic contact pad to corrode over a period of time, wherein the SIM card is enclosed within air-tight packaging;

providing the SIM card enclosed within the air-tight packaging to a consumer;

operating a telecommunications network that is operable to provide mobile communications to a consumer mobile device that has the SIM card inserted therein, wherein the mobile communications are provided during the period of time until the corrosive chemical agent has corroded the at least one metallic contact pad such that the SIM card is no longer operable within the consumer mobile device.

13. The method of claim 12, wherein each contact pad of the plurality of metallic contact pads comprises an enclosed, interior portion, and wherein each enclosed, interior portion contains the corrosive chemical agent.

14. The method of claim 12, wherein the plurality of metallic contact pads comprise gold or a gold alloy.

15. The method of claim 14, wherein the corrosive chemical agent comprises an elemental group 15- or group 16-containing chemical species.

16. The method of claim 15, wherein the corrosive chemical agent comprises a nitrogen-containing species.

17. The method of claim 15, wherein the corrosive chemical agent comprises a sulfur-containing species.

18. The method of claim 12, wherein the corrosive chemical agent is in the form of a liquid, gel, paste, or solid.

19. The method of claim 12, wherein the air-tight packaging comprises a non-reactive gas.

\* \* \* \* \*